United States Patent
Inagaki

(10) Patent No.: US 12,412,290 B2
(45) Date of Patent: Sep. 9, 2025

(54) SUBJECT TRACKING APPARATUS, IMAGE CAPTURING APPARATUS, SUBJECT TRACKING METHOD, AND STORAGE MEDIUM

(71) Applicant: CANON KABUSHIKI KAISHA, Tokyo (JP)

(72) Inventor: Yu Inagaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 621 days.

(21) Appl. No.: 17/717,245

(22) Filed: Apr. 11, 2022

(65) Prior Publication Data
US 2022/0351395 A1    Nov. 3, 2022

(30) Foreign Application Priority Data
Apr. 30, 2021   (JP) .................................. 2021-078081

(51) Int. Cl.
| | |
|---|---|
| *G06T 7/35* | (2017.01) |
| *G01B 11/14* | (2006.01) |
| *G06T 5/40* | (2006.01) |
| *G06T 7/33* | (2017.01) |
| *H04N 23/54* | (2023.01) |

(52) U.S. Cl.
CPC ............... *G06T 7/35* (2017.01); *G01B 11/14* (2013.01); *G06T 5/40* (2013.01); *G06T 7/337* (2017.01); *H04N 23/54* (2023.01); *G06T 2207/10021* (2013.01)

(58) Field of Classification Search
CPC .. G06T 7/35; G06T 7/337; G06T 5/40; H04N 23/54; G01B 11/14
See application file for complete search history.

(56) References Cited

U.S. PATENT DOCUMENTS

| | | | |
|---|---|---|---|
| 5,929,803 A | 7/1999 | Uehara et al. | |
| 8,208,058 B2 | 6/2012 | Karasawa | |
| 9,854,149 B2 * | 12/2017 | Matsuyama | ......... H04N 23/635 |
| 10,021,289 B2 | 7/2018 | Inagaki | |
| 10,321,044 B2 | 6/2019 | Inagaki | |

(Continued)

FOREIGN PATENT DOCUMENTS

| | | |
|---|---|---|
| JP | H11-072557 A | 3/1999 |
| JP | 2010-262033 A | 11/2010 |

(Continued)

OTHER PUBLICATIONS

Office Action dated Mar. 7, 2025, in Japanese Patent Application No. 2021-078081.

*Primary Examiner* — Matthew C Bella
*Assistant Examiner* — Jinsu Hwang
(74) *Attorney, Agent, or Firm* — Venable LLP

(57) ABSTRACT

There is provided a subject tracking apparatus. An obtainment unit obtains first and second shot images, and depth direction distance information in a plurality of regions in each of the first and second shot images. A specifying unit specifies a subject to be tracked in the first and second shot images based on the distance information of the first and second shot images. The specifying unit specifies a region of the subject to be tracked in the second shot image corresponding to a region of the subject to be tracked in the first shot image by comparing histograms of the distance information of the first and second shot images.

22 Claims, 10 Drawing Sheets

(56) References Cited

U.S. PATENT DOCUMENTS

| | | |
|---|---|---|
| 10,362,214 B2 | 7/2019 | Inagaki |
| 11,009,675 B2 | 5/2021 | Yoshino et al. |
| 11,933,896 B2 | 3/2024 | Tachino et al. |

FOREIGN PATENT DOCUMENTS

| | | |
|---|---|---|
| JP | 2014-232181 A | 12/2014 |
| JP | 2018-007078 A | 1/2018 |
| JP | 2019-120734 A | 7/2019 |
| WO | 2019/194039 A1 | 10/2019 |

* cited by examiner

PLAN VIEW a-a CROSS-SECTIONAL VIEW

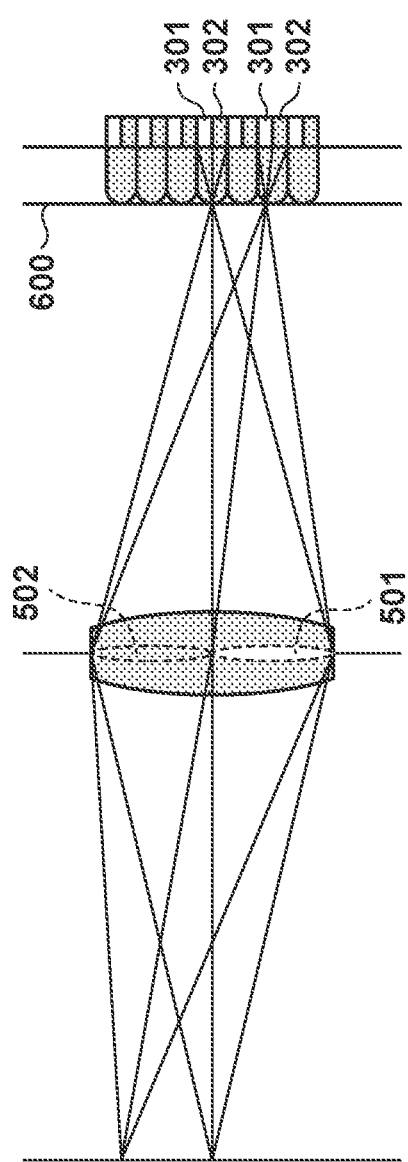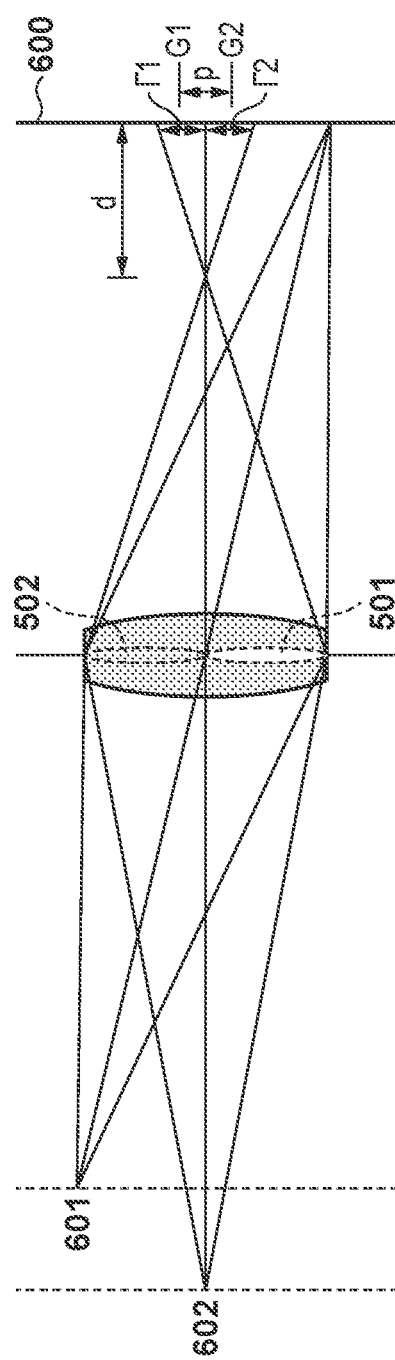

FIG. 8A

| | SUBJECT | HISTOGRAM |
|---|---|---|
| FRAME 1 | 801, 800, 802 | 841±x1, 841, INFINITY def NEAREST |
| FRAME 2 | 801, 802 | 842±x1, 842, INFINITY def NEAREST |
| FRAME 3 | 801, 802 | 843a, INFINITY def NEAREST |
| FRAME 4 | 801, 802 | INFINITY def NEAREST |

FIG. 8B

| | FORWARD-BACKWARD RELATIONSHIP MATCHING | SHAPE MATCHING |
|---|---|---|
| FRAME 1 | NON-EXECUTION | NON-EXECUTION |
| FRAME 2 | 812, 832, 821 (INFINITY — def — NEAREST) | 832±x2, 842, 862, 852 (INFINITY — def — NEAREST) |
| FRAME 3 | 813, 833, 822 (INFINITY — def — NEAREST) | 833±x2, 843a, 843b, 863, 853 (INFINITY — def — NEAREST) |
| FRAME 4 | NON-EXECUTION | NON-EXECUTION |

SUBJECT TRACKING APPARATUS, IMAGE CAPTURING APPARATUS, SUBJECT TRACKING METHOD, AND STORAGE MEDIUM

BACKGROUND OF THE INVENTION

Field of the Invention

The present invention relates to a subject tracking apparatus, an image capturing apparatus, a subject tracking method, and a storage medium.

Description of the Related Art

Japanese Patent Laid-Open No. 2014-232181 discloses a technique for obtaining a frequency distribution (histogram) of subject distances (defocus amounts), selecting a plurality of subject distances based on peaks of the frequency of appearance, and obtaining a plurality of captured images focused on each subject distance.

When performing continuous shooting using servo AF, users generally wish to obtain a plurality of images shot in succession in the time direction, with one specific subject in focus. However, with the technique disclosed in Japanese Patent Laid-Open No. 2014-232181, a plurality of images shot in succession in the time direction, with one specific subject in focus, cannot be obtained.

SUMMARY OF THE INVENTION

Having been achieved in light of such circumstances, the present invention provides a technique which makes it possible to track a subject with high accuracy between shot images (between frames).

According to a first aspect of the present invention, there is provided a subject tracking apparatus comprising at least one processor and/or at least one circuit which functions as: an obtainment unit configured to obtain first and second shot images, and depth direction distance information in a plurality of regions in each of the first and second shot images; and a specifying unit configured to specify a subject to be tracked in the first and second shot images based on the distance information of the first and second shot images, wherein the specifying unit specifies a region of the subject to be tracked in the second shot image corresponding to a region of the subject to be tracked in the first shot image by comparing histograms of the distance information of the first and second shot images.

According to a second aspect of the present invention, there is provided a subject tracking apparatus comprising at least one processor and/or at least one circuit which functions as: an obtainment unit configured to obtain a first histogram of a plurality of defocus amounts corresponding to a plurality of ranging points in a first shot image, a first subject class that is a class of the first histogram to which a defocus amount of a subject to be tracked in the first shot image belongs, and a second histogram of a plurality of defocus amounts corresponding to a plurality of ranging points in a second shot image shot after the first shot image; a calculation unit configured to calculate a feature amount of a first type of the first subject class in the first histogram, and a plurality of feature amounts of the first type of a first plurality of classes of the second histogram in the second histogram; a detection unit configured to detect a specific first class, among the first plurality of classes of the second histogram, based on the feature amount of the first type in the first subject class; and a specifying unit configured to, based on the specific first class, specify a second subject class that is a class of the second histogram to which a defocus amount of the subject to be tracked in the second shot image belongs.

According to a third aspect of the present invention, there is provided an image capturing apparatus, comprising: the subject tracking apparatus according the first aspect; and an image sensor configured to generate respective shot images.

According to a fourth aspect of the present invention, there is provided an image capturing apparatus, comprising: the subject tracking apparatus according to the second aspect; and an image sensor configured to generate respective shot images.

According to a fifth aspect of the present invention, there is provided a subject tracking method executed by a subject tracking apparatus, comprising: obtaining first and second shot images, and depth direction distance information in a plurality of regions in each of the first and second shot images; and specifying a subject to be tracked in the first and second shot images based on the distance information of the first and second shot images, wherein specifying the subject to be tracked in the first and second shot images includes specifying a region of the subject to be tracked in the second shot image corresponding to a region of the subject to be tracked in the first shot image by comparing histograms of the distance information of the first and second shot images.

According to a sixth aspect of the present invention, there is provided a subject tracking method executed by a subject tracking apparatus, comprising: obtaining a first histogram of a plurality of defocus amounts corresponding to a plurality of ranging points in a first shot image, a first subject class that is a class of the first histogram to which a defocus amount of a subject to be tracked in the first shot image belongs, and a second histogram of a plurality of defocus amounts corresponding to a plurality of ranging points in a second shot image shot after the first shot image; calculating a feature amount of a first type of the first subject class in the first histogram, and a plurality of feature amounts of the first type of a first plurality of classes of the second histogram in the second histogram; detecting a specific first class, among the first plurality of classes of the second histogram, based on the feature amount of the first type in the first subject class; and based on the specific first class, specifying a second subject class that is a class of the second histogram to which a defocus amount of the subject to be tracked in the second shot image belongs.

According to a seventh aspect of the present invention, there is provided a non-transitory computer-readable storage medium which stores a program for causing a computer to execute a subject tracking method comprising: obtaining first and second shot images, and depth direction distance information in a plurality of regions in each of the first and second shot images; and specifying a subject to be tracked in the first and second shot images based on the distance information of the first and second shot images, wherein specifying the subject to be tracked in the first and second shot images includes specifying a region of the subject to be tracked in the second shot image corresponding to a region of the subject to be tracked in the first shot image by comparing histograms of the distance information of the first and second shot images.

According to an eighth aspect of the present invention, there is provided a non-transitory computer-readable storage medium which stores a program for causing a computer to execute a subject tracking method comprising: obtaining a first histogram of a plurality of defocus amounts corresponding to a plurality of ranging points in a first shot image, a first subject class that is a class of the first histogram to which a defocus amount of a subject to be tracked in the first shot image belongs, and a second histogram of a plurality of defocus amounts corresponding to a plurality of ranging points in a second shot image shot after the first shot image; calculating a feature amount of a first type of the first subject class in the first histogram, and a plurality of feature amounts of the first type of a first plurality of classes of the second histogram in the second histogram; detecting a specific first class, among the first plurality of classes of the second histogram, based on the feature amount of the first type in the first subject class; and based on the specific first class, specifying a second subject class that is a class of the second histogram to which a defocus amount of the subject to be tracked in the second shot image belongs.

Further features of the present invention will become apparent from the following description of exemplary embodiments with reference to the attached drawings.

BRIEF DESCRIPTION OF THE DRAWINGS

FIG. 5 is a schematic diagram illustrating a correspondence relationship between the image sensor 122 and a pupil division.

FIG. 6 is a schematic relationship diagram illustrating a relationship between (a) a defocus amount based on a first focus detection signal and a second focus detection signal and (b) an image shift amount between the first focus detection signal and the second focus detection signal.

FIG. 8A is a conceptual diagram illustrating a subject and a histogram for frames 1 to 4.

FIG. 8B is a conceptual diagram illustrating matching of feature amounts in a forward-backward relationship and matching of shape feature amounts for frames 1 to 4.

DESCRIPTION OF THE EMBODIMENTS

Figure 1:
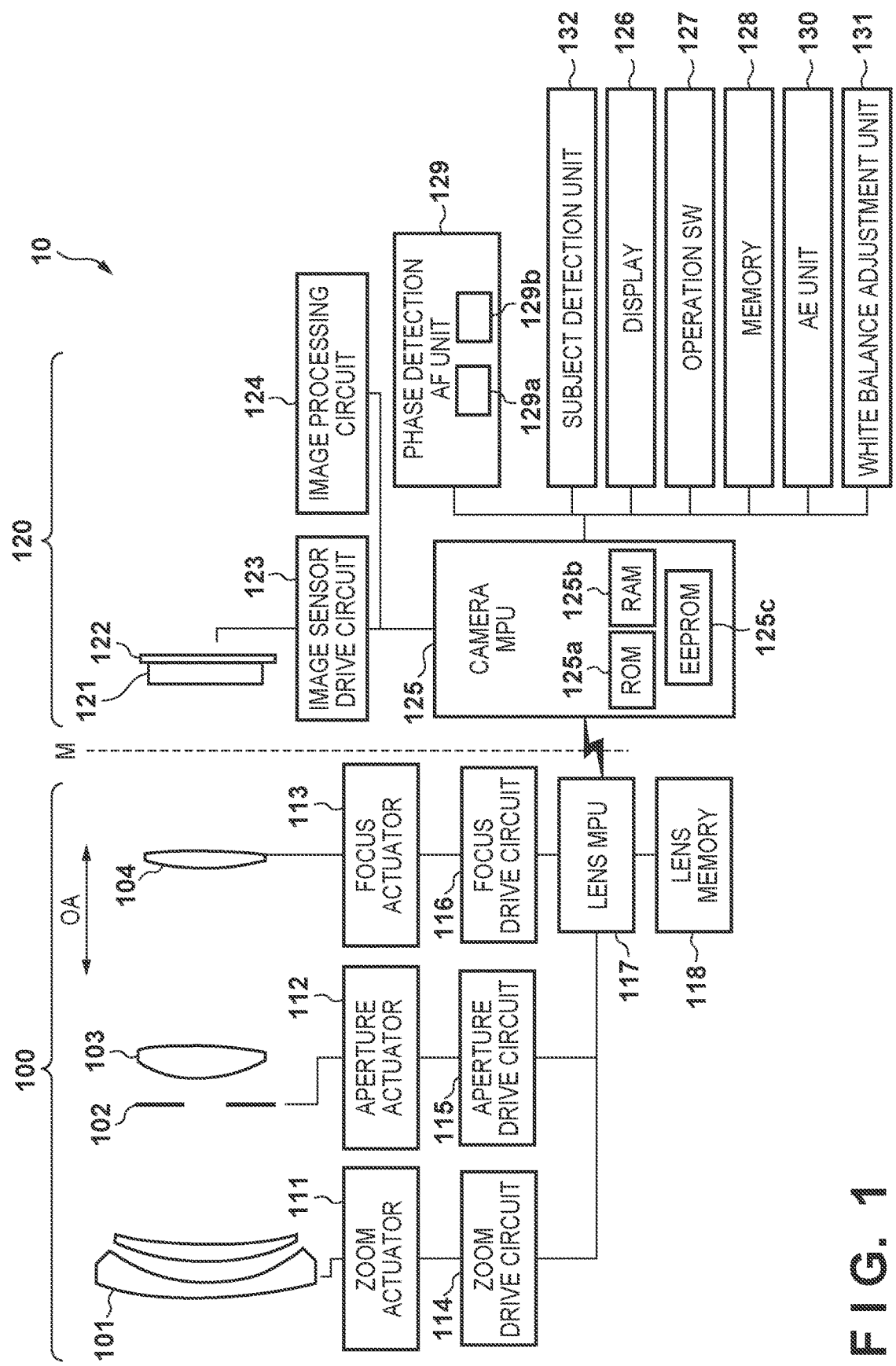
FIG. 1 is a block diagram illustrating the configuration of an image capturing apparatus 10 including an image capturing control apparatus.

Hereinafter, embodiments of the present invention will be described with reference to the attached drawings. Elements that are given the same reference numerals throughout all of the attached drawings represent the same or similar elements, unless otherwise specified. Note that the technical scope of the present invention is defined by the claims, and is not limited by the following respective embodiments. Also, not all of the combinations of the aspects that are described in the embodiments are necessarily essential to the present invention. Also, the aspects that are described in the individual embodiments can be combined as appropriate.

First Embodiment

Configuration of Image Capturing Apparatus 10

FIG. 1 is a block diagram illustrating the configuration of an image capturing apparatus 10 including a subject tracking apparatus. In the example in FIG. 1, the image capturing apparatus 10 is an interchangeable lens-type single-lens reflex digital camera. The image capturing apparatus 10 takes the form of a camera system that includes a lens unit 100 (an interchangeable lens) and a camera body 120. The lens unit 100 is removably attached to the camera body 120 via a mount M, which is indicated by a dotted line in FIG. 1. However, the present embodiment is not limited to the configuration illustrated in FIG. 1, and can also be applied in an image capturing apparatus (a digital camera) in which a lens unit (an imaging optical system) and a camera body are integrated. The present embodiment is also not limited to a digital camera, and can be applied in another image capturing apparatus such as a video camera.

The lens unit 100 includes a first lens group 101, an aperture stop 102, a second lens group 103, a focus lens group (called simply a "focus lens" hereinafter) 104, and a drive/control system, which serve as an optical system. In this manner, the lens unit 100 includes the focus lens 104, and is an image capturing lens that forms a subject image (an imaging optical system).

The first lens group 101 is disposed at a front end of the lens unit 100, and is held so as to be capable of moving forward and backward in an optical axis direction OA. The aperture stop 102 adjusts a light amount during shooting by adjusting the opening diameter thereof, and also functions as an exposure time adjustment shutter when shooting still images. The aperture stop 102 and the second lens group 103 are capable of moving together in the optical axis direction OA, and by operating in tandem with the forward/backward movement of the first lens group 101, realize a zoom function. The focus lens 104 is capable of moving in the optical axis direction OA, and a subject distance on which the lens unit 100 focuses (focal distance) changes in accordance with the position thereof. By controlling the position of the focus lens 104 in the optical axis direction OA, focal point adjustment of adjusting the focal distance of the lens unit 100 (focus control) can be performed.

The drive/control system includes a zoom actuator 111, an aperture actuator 112, a focus actuator 113, a zoom drive circuit 114, an aperture drive circuit 115, a focus drive circuit 116, a lens MPU 117, and lens memory 118. The zoom drive circuit 114 drives the first lens group 101, the second lens group 103, and the like in the optical axis direction OA using the zoom actuator 111, and controls the angle of view of the optical system of the lens unit 100 (performs zoom operations). The aperture drive circuit 115 drives the aperture stop 102 using the aperture actuator 112, and controls the opening diameter, opening and closing, and the like of the aperture stop 102. The focus drive circuit 116 drives the focus lens 104 in the optical axis direction OA using the focus actuator 113, and controls the focal distance of the optical system of the lens unit 100 (performs focus control). The focus drive circuit 116 also functions as a position detection unit that detects the current position of the focus lens 104 (a lens position) using the focus actuator 113.

The lens MPU 117 (a processor) performs all calculations and control related to the lens unit 100, and controls the zoom drive circuit 114, the aperture drive circuit 115, and the focus drive circuit 116. The lens MPU 117 is also connected to a camera MPU 125 via the mount M, and communicates commands, data, and the like. For example, the lens MPU 117 detects the position of the focus lens 104 and communicates lens position information in response to requests from the camera MPU 125. This lens position information includes information on the position of the focus lens 104 in the optical axis direction OA, the position and the diameter, in the optical axis direction OA, of the exit pupil in a state where the optical system is not moving, the position and the diameter, in the optical axis direction OA, of a lens frame that limits a light flux of the exit pupil, and so on. The lens MPU 117 controls the zoom drive circuit 114, the aperture drive circuit 115, and the focus drive circuit 116 in response to requests from the camera MPU 125. The lens memory 118 stores optical information necessary for automatic focal point adjustment (AF control). The camera MPU 125 controls the operations of the lens unit 100 by executing programs stored in built-in non-volatile memory, the lens memory 118, or the like, for example.

The camera body 120 includes an optical low-pass filter 121, an image sensor 122, and a drive/control system. The optical low-pass filter 121 and the image sensor 122 function as an image capturing unit that photoelectrically converts a subject image (optical image) formed via the lens unit 100 and outputs image data. In the present embodiment, the image sensor 122 photoelectrically converts the subject image formed via the optical imaging system, and outputs a captured image signal and a focus detection signal as the image data. Additionally, in the present embodiment, the first lens group 101, the aperture stop 102, the second lens group 103, the focus lens 104, and the optical low-pass filter 121 constitute the imaging optical system.

The optical low-pass filter 121 reduces false colors, moiré, and so on in shot images. The image sensor 122 is constituted by a CMOS image sensor and peripheral circuitry thereof, with m pixels arranged in the horizontal direction and n pixels in the vertical direction (where m and n are integers of 2 or greater). The image sensor 122 of the present embodiment also plays the role of a focus detection device, has a pupil division function, and has pupil-divided pixels capable of phase difference detection-based focus detection (phase detection AF) using image data (image signals). An image processing circuit 124 generates data for phase detection AF, as well as image data for display, recording, and subject detection, based on the image data output from the image sensor 122.

The drive/control system includes an image sensor drive circuit 123, the image processing circuit 124, the camera MPU 125, a display 126, an operation switch group (operation SW) 127, memory 128, a phase detection AF unit 129 (an image capturing plane phase detection unit; a control unit), an AE unit 130 (the control unit), a white balance adjustment unit 131 (the control unit), and a subject detection unit 132 (a detection unit). The image sensor drive circuit 123 controls the operations of the image sensor 122, and also A/D converts the image signal (image data) output from the image sensor 122 and transmits the result to the camera MPU 125. The image processing circuit 124 performs general image processing performed in digital cameras, such as γ conversion, color interpolation processing, compression encoding processing, and the like on the image signal output from the image sensor 122. The image processing circuit 124 generates a signal for phase detection AF, a signal for AE, a signal for white balance adjustment, and a signal for subject detection. Although the signal for phase detection AF, the signal for AE, the signal for white balance adjustment, and the signal for subject detection are respectively generated in the present embodiment, the signal for AE, the signal for white balance adjustment, and the signal for subject detection may, for example, be generated as a common signal. The signals to be generated as a common signal are not limited thereto.

The camera MPU 125 (a processor; a control device) performs all calculations and control related to the camera body 120. In other words, the camera MPU 125 controls the image sensor drive circuit 123, the image processing circuit 124, the display 126, the operation switch group 127, the memory 128, the phase detection AF unit 129, the AE unit 130, the white balance adjustment unit 131, and the subject detection unit 132. The camera MPU 125 is connected to the lens MPU 117 by a signal line of the mount M, and communicates commands, data, and the like with the lens MPU 117. The camera MPU 125 obtains the lens position from the lens MPU 117, issues a lens drive request for a predetermined drive amount to the lens MPU 117, and the like, and furthermore issues an obtainment request for unique optical information of the lens unit 100 from the lens MPU 117.

ROM 125a which stores programs for controlling the operations of the camera body 120, RAM 125b which stores variables (camera memory), and EEPROM 125c which stores various types of parameters are incorporated into the camera MPU 125. The camera MPU 125 executes focus detection processing based on a program stored in the ROM 125a. In the focus detection processing, publicly-known correlation calculation processing is executed using a pair of image signals obtained by photoelectrically converting optical images formed by light fluxes passing through mutually-different pupil regions (partial pupil regions) of the imaging optical system.

The display 126 is constituted by an LCD or the like, and displays information pertaining to a shooting mode of the image capturing apparatus 10, pre-shooting preview images and post-shooting confirmation images, focus state display images during focus detection, and the like. The operation switch group 127 is constituted by a power switch, a release (shooting trigger) switch, a zoom operation switch, a shooting mode selection switch, and the like. The memory 128 (a recording unit) is removable flash memory, in which shot images are stored.

The phase detection AF unit 129 performs focus detection processing using the phase detection method, based on image signals of focus detection image data (signals for phase detection AF) obtained from the image sensor 122 and the image processing circuit 124. To be more specific, the image processing circuit 124 generates a pair of image data formed by light fluxes passing through a pair of pupil regions of the imaging optical system as focus detection data, and the phase detection AF unit 129 detects a focus shift amount based on a shift amount in the pair of image data. In this manner, the phase detection AF unit 129 of the present embodiment does not use a dedicated AF sensor, and instead performs phase detection AF based on the output of the image sensor 122 (image capturing plane phase detection AF). In the present embodiment, the phase detection AF unit 129 includes an obtainment unit 129a and a calculation unit 129b. The operations of these units will be described later.

Note that at least part of the phase detection AF unit 129 (at least one of the obtainment unit 129a or the calculation unit 129b) may be provided in the camera MPU 125. The operations of the phase detection AF unit 129 will be described in detail later. The phase detection AF unit 129 functions as a focus control unit that controls the position of the focus lens 104 using a focus detection result.

The AE unit 130 performs exposure adjustment processing for implementing appropriate shooting conditions by performing photometry based on the signal for AE obtained from the image sensor 122 and the image processing circuit 124. Specifically, the photometry is performed based on the signal for AE, and an exposure amount at the aperture value, shutter speed, and ISO sensitivity currently set is calculated. Exposure adjustment processing is performed by calculating an appropriate aperture value, shutter speed, and ISO sensitivity to be set during shooting, and setting those values as shooting conditions, from a difference between the calculated exposure amount and a predetermined appropriate exposure amount. The AE unit 130 functions as an exposure adjustment unit that calculates exposure conditions for shooting using a photometry result and controls the aperture value, the shutter speed, and the ISO sensitivity of the aperture stop 102.

The white balance adjustment unit 131 performs white balance adjustment processing based on the signal for white balance adjustment obtained from the image sensor 122 and the image processing circuit 124. Specifically, the white balance adjustment processing is performed by calculating the white balance of the signal for white balance adjustment and adjusting the weights of colors based on a difference from a predetermined appropriate white balance.

The subject detection unit 132 performs subject detection processing based on the signal for subject detection generated by the image processing circuit 124. The type, state, and the like of the subject (detection attributes), and the position and size of the subject (detection region), are detected through the subject detection processing. Note that the operations of the subject detection unit 132 will be described in detail later.

In this manner, the image capturing apparatus 10 of the present embodiment is capable of executing a combination of phase detection AF, photometry (exposure adjustment), white balance adjustment, and subject detection, and can select a position for performing phase detection AF, photometry, and white balance adjustment (an image height range) in accordance with a result of the subject detection.

Configuration of Image Sensor 122

Figure 2:
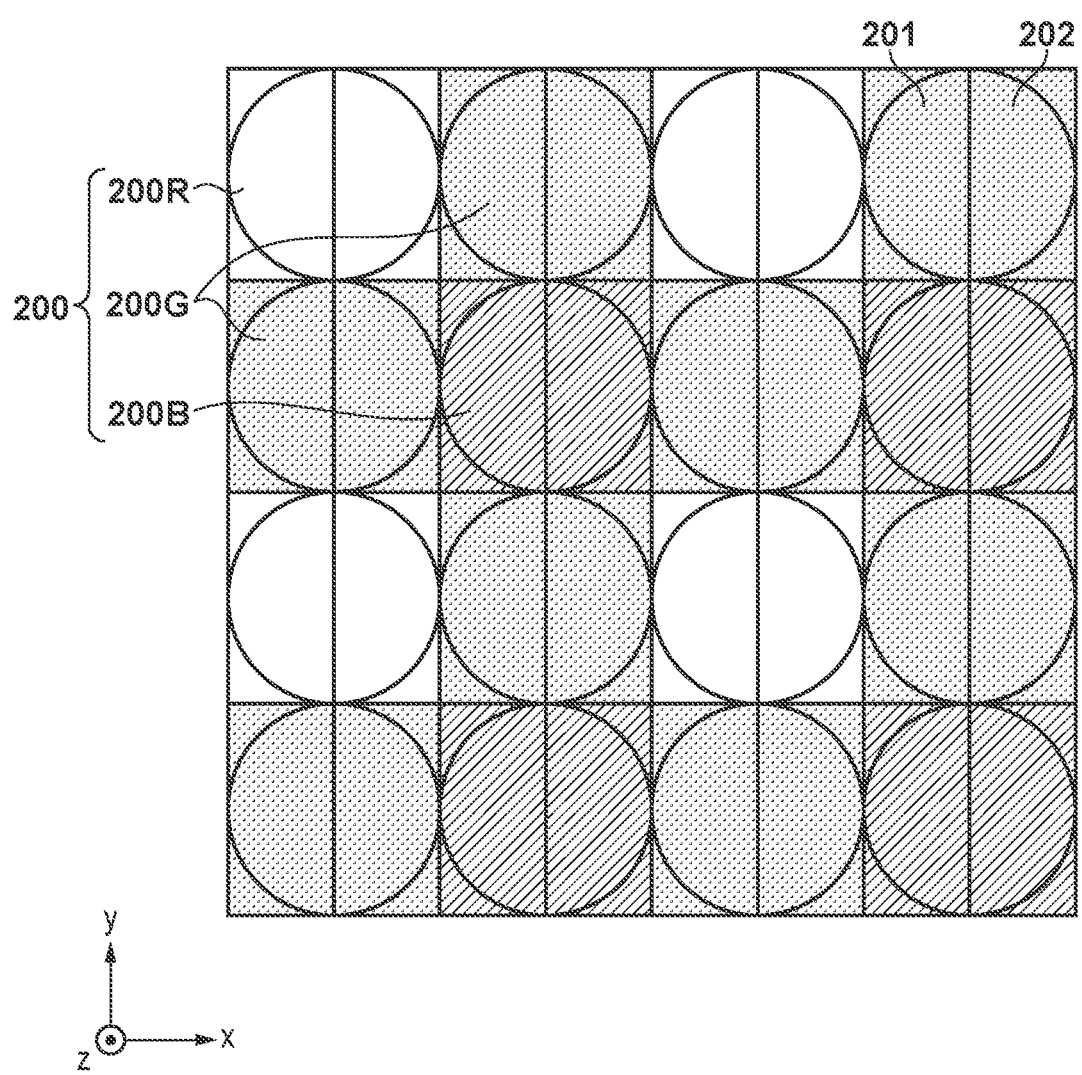
FIG. 2 is a schematic diagram illustrating the arrangement of image capturing pixels (and focus detection pixels) in an image sensor 122.

FIG. 2 is a schematic diagram illustrating the arrangement of image capturing pixels (and focus detection pixels) in the image sensor 122. FIG. 2 illustrates a pixel (image capturing pixel) array of a two-dimensional CMOS sensor (the image sensor 122) of the present embodiment in a range of four columns by four rows, and a focus detection pixel array in a range of eight columns by four rows. In the first embodiment, a two-column by two-row pixel group 200 illustrated in FIG. 2 has a pixel 200R having R (red) spectral sensitivity at the upper-left, a pixel 200G having G (green) spectral sensitivity at each of the upper-right and the lower-left, and a pixel 200B having B (blue) spectral sensitivity at the lower-right. Furthermore, each pixel is constituted by a first focus detection pixel 201 and a second focus detection pixel 202 arranged in two columns by one row.

A large number of the four-column by four-row pixels (eight-column by four-line focus detection pixels) illustrated in FIG. 2 are arranged on the surface, which makes it possible to obtain a captured image (a focus detection signal). In the present embodiment, a pixel period P is assumed to be 4 μm, a number of pixels N is assumed to be 5,575 horizontal columns by 3,725 vertical rows for approximately 20.75 million pixels, a column direction period PAF of the focus detection pixels is assumed to be 2 μm, and a number of focus detection pixels NAF is assumed to be 11,150 horizontal columns by 3,725 vertical rows for approximately 41.5 million pixels.

Figure 3A:
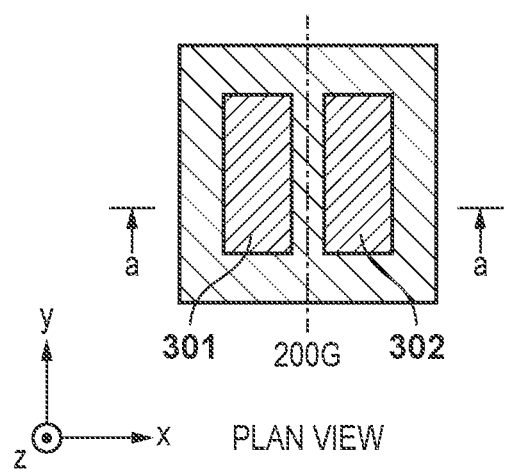
FIG. 3A is a plan view of one pixel 200G of the image sensor 122 illustrated in FIG. 2, viewed from a light receiving surface side (+z side) of the image sensor 122.
Figure 3B:
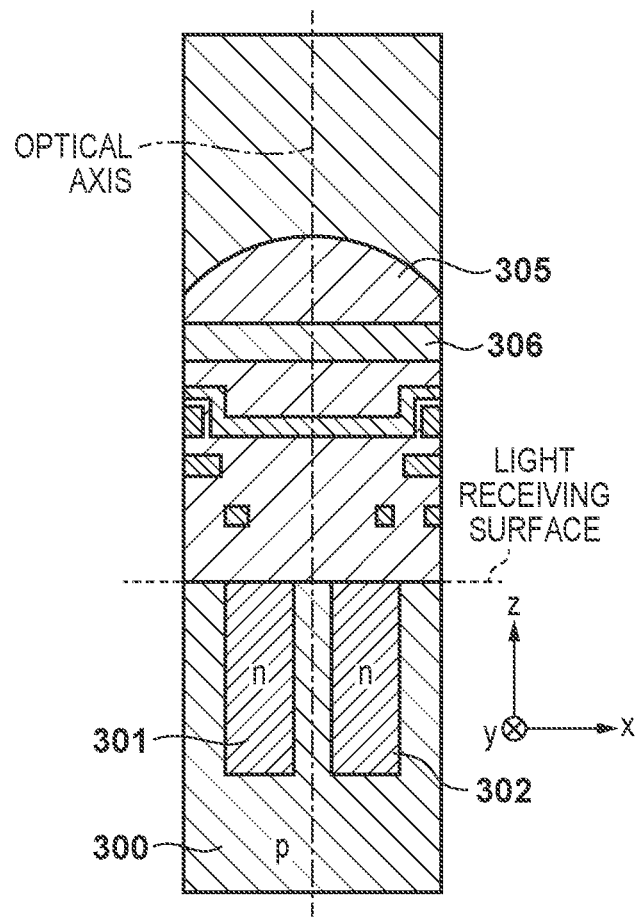
FIG. 3B is a cross-sectional view of an a-a cross-section in FIG. 3A, viewed from a −y side.

FIG. 3A is a plan view of one pixel 200G of the image sensor 122 illustrated in FIG. 2, viewed from a light receiving surface side (+z side) of the image sensor 122, and FIG. 3B is a cross-sectional view of an a-a cross-section in FIG. 3A, viewed from a −y side.

As illustrated in FIGS. 3A and 3B, in the pixel 200G of the present embodiment, a microlens 305 for focusing incident light is formed on the light receiving side of each pixel, and a photoelectric conversion unit 301 and a photoelectric conversion unit 302, divided NH times (twice) in the x direction and NV times in the y direction (once), are formed. The photoelectric conversion unit 301 and the photoelectric conversion unit 302 correspond to the first focus detection pixel 201 and the second focus detection pixel 202, respectively.

The photoelectric conversion unit 301 and the photoelectric conversion unit 302 may be pin-structure photodiodes in which an intrinsic layer is interposed between a p-type layer and an n-type layer, or if necessary, may be pn-junction photodiodes with the intrinsic layer omitted. In each pixel, a color filter 306 is formed between the microlens 305, and the photoelectric conversion unit 301 and photoelectric conversion unit 302. Furthermore, if necessary, the spectral transmittance of the color filter 306 may be changed at the sub-pixel level, or the color filter 306 may be omitted.

The light incident on the pixel 200G illustrated in FIGS. 3A and 3B is focused by the microlens 305, spectrally divided by the color filter 306, and then received by the photoelectric conversion unit 301 and the photoelectric conversion unit 302. In the photoelectric conversion unit 301 and the photoelectric conversion unit 302, electrons and holes are generated in pairs according to the received light amount, and after being separated by a barrier layer, the negatively-charged electrons are stored in the n-type layer (not shown). On the other hand, the holes are discharged to the exterior of the image sensor 122 through the p-type layer connected to a constant voltage source (not shown). The electrons accumulated in the n-type layers (not shown) of the photoelectric conversion unit 301 and the photoelectric conversion unit 302 are transferred to an electrostatic capacitance unit (FD) via a transfer gate and converted into voltage signals.

Figure 4:
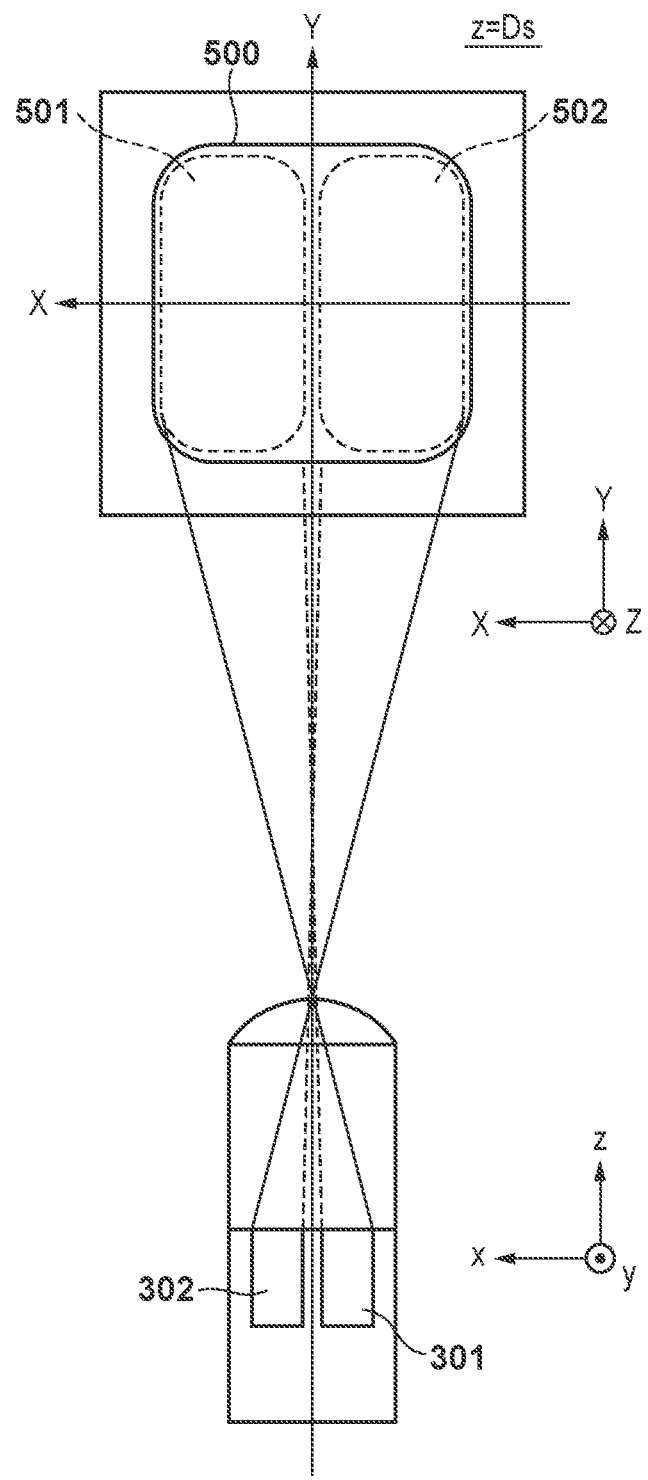
FIG. 4 is a general descriptive diagram illustrating a correspondence relationship between a pixel structure and a pupil division in the embodiment illustrated in FIGS. 3A and 3B.

FIG. 4 is a general descriptive diagram illustrating a correspondence relationship between a pixel structure and a pupil division in the present embodiment illustrated in FIGS. 3A and 3B. FIG. 4 illustrates a cross-sectional view of an a-a cross-section of the pixel structure of the present embodiment, illustrated in FIG. 3A from the +y side, as well as a pupil plane (pupil distance Ds) of the image sensor 122. In FIG. 4, the x axis and the y axis of the cross-sectional view are inverted with respect to FIGS. 3A and 3B in order to correspond to the coordinate axes of the pupil plane of the image sensor 122.

In FIG. 4, a first partial pupil region 501 of the first focus detection pixel 201 is, due to the microlens, generally in a conjugate relationship with the light receiving surface of the photoelectric conversion unit 301, which has a center of gravity eccentric in the −x direction, and represents a pupil region through which light can be received by the first focus detection pixel 201. The center of gravity of the first partial pupil region 501 of the first focus detection pixel 201 is eccentric in the +X direction on the pupil plane. In FIG. 4, a second partial pupil region 502 of the second focus detection pixel 202 is, due to the microlens, generally in a conjugate relationship with the light receiving surface of the photoelectric conversion unit 302, which has a center of gravity eccentric in the +x direction, and represents a pupil region through which light can be received by the second focus detection pixel 202. The center of gravity of the second partial pupil region 502 of the second focus detection pixel 202 is eccentric in the −X direction on the pupil plane. Additionally, in FIG. 4, a pupil region 500 is a pupil region through which light can be received by the entire pixel 200G when the photoelectric conversion unit 301 and the photoelectric conversion unit 302 (the first focus detection pixel 201 and the second focus detection pixel 202) are all combined.

Image capturing plane phase detection AF is affected by diffraction due to pupil division using the microlenses of the image sensor. In FIG. 4, the pupil distance to the pupil plane of the image sensor is several tens of mm, whereas the diameter of each microlens is several μm. Accordingly, the aperture value of the microlens is several tens of thousands, resulting in diffraction blur at the level of several tens of mm. As a result, the image on the light receiving surface of the photoelectric conversion unit will not have a clear pupil region, partial pupil region, or the like, but will instead have light receiving sensitivity characteristics (an incident angle distribution of the light receiving rate).

FIG. 5 is a schematic diagram illustrating a correspondence relationship between the image sensor 122 and a pupil division. The image sensor 122 is disposed at an image capturing plane 600. Light fluxes passing through different partial pupil regions of the first partial pupil region 501 and the second partial pupil region 502 are incident on each pixel of the image sensor 122 at different angles, and are received by the first focus detection pixel 201 and the second focus detection pixel 202 divided into 2×1. The present embodiment describes an example in which the pupil region is divided in two in the horizontal direction. The pupil region may be divided in the vertical direction as necessary.

In the image sensor 122 of the present embodiment, a plurality of image capturing pixels having the first focus detection pixel 201 and the second focus detection pixel 202 are arranged. The first focus detection pixel 201 receives a light flux passing through the first partial pupil region 501 of the optical imaging system. The second focus detection pixel 202 receives a light flux passing through the second partial pupil region 502 of the optical imaging system, which is different from the first partial pupil region 501. The image capturing pixel receives a light flux passing through a pupil region that is a combination of the first partial pupil region 501 and the second partial pupil region 502 of the optical imaging system.

In the image sensor 122 of the present embodiment, each image capturing pixel is constituted by the first focus detection pixel 201 and the second focus detection pixel 202. If necessary, the configuration may be such that the image capturing pixel, the first focus detection pixel 201, and the second focus detection pixel 202 are configured as respective pixels, and the first focus detection pixel 201 and the second focus detection pixel 202 are disposed in only parts of the array of image capturing pixels.

In the present embodiment, focus detection is performed by collecting the light receiving signal of the first focus detection pixel 201 of each pixel of the image sensor 122 and generating a first focus signal, and collecting the light receiving signal of the second focus detection pixel 202 of each pixel and generating a second focus signal. Additionally, a captured image signal at the resolution of the effective number of pixels N (a captured image) is generated by adding the signals from the first focus detection pixel 201 and the second focus detection pixel 202 for each pixel in the image sensor 122. The methods for generating the signals are not limited to the methods mentioned above, and for example, the second focus detection signal may be generated from a difference between the captured image signal and the first focus signal.

Relationship Between Defocus Amount and Image Shift Amount

A relationship between a defocus amount and an image shift amount based on the first focus detection signal and the second focus detection signal obtained by the image sensor 122 of the present embodiment will be described next.

FIG. 6 is a schematic relationship diagram illustrating a relationship between (a) a defocus amount based on the first focus detection signal and the second focus detection signal and (b) an image shift amount between the first focus detection signal and the second focus detection signal. The image sensor 122 is disposed at an image capturing plane 600. Similar to FIGS. 4 and 5, the pupil plane of the image sensor 122 is divided in two, i.e., into the first partial pupil region 501 and the second partial pupil region 502.

A defocus amount d is defined taking a distance from an image formation position of a subject to the image capturing plane as a magnitude |d|, with a forward focus state in which the image formation position of the subject is on the subject side of the image capturing plane having a negative sign (d<0). A rearward focus state in which the image formation position of the subject is on the opposite side of the image capturing plane from the subject is defined with a positive sign (d>0). In an in-focus state, where the image formation position of the subject is at the image capturing plane (an in-focus position), d=0. FIG. 6 illustrates an example in which a subject 601 is in an in-focus state (d=0), and a subject 602 is in a forward focus state (d<0). The forward focus state (d<0) and the rearward focus state (d>0) will be collectively referred to as a defocus state (|d|>0).

In the forward focus state (d<0), of the light flux from the subject 602, a light flux passing through the first partial pupil region 501 (the second partial pupil region 502) is first focused, and then spreads to a width Γ1 (Γ2) centered on a center of gravity position G1 (G2) of the light flux, becoming a blurry image at the image capturing plane 600. The blurry image is received by the first focus detection pixel 201 (the second focus detection pixel 202) constituting each pixel arranged in the image sensor 122, and the first focus detection signal (the second focus detection signal) is generated. Accordingly, the first focus detection signal (the second focus detection signal) is recorded as a subject image in which the subject 602 is blurred at the width Γ1 (Γ2) at the center of gravity position G1 (G2) on the image capturing plane 600. The blur width Γ1 (Γ2) of the subject image increases roughly proportionally with an increase in the magnitude |d| of the defocus amount d. Similarly, a magnitude |p| of an image shift amount p of the subject image between the first focus detection signal and the second focus detection signal (p=a difference between the center of gravity positions of the light fluxes, i.e., G1-G2) also increases roughly proportionally with an increase in the magnitude |d| of the defocus amount d. This is similar in the rearward focus state (d>0) as well, although the direction of the shift of the subject image between the first focus detection signal and the second focus detection signal is the opposite from the forward focus state.

As the magnitude of the defocus amount of the first focus detection signal and the second focus detection signal, or the captured image signal obtained by adding the first focus detection signal and the second focus detection signal, increases, so too does the magnitude of the image shift amount between the first focus detection signal and the second focus detection signal.

Accordingly, in the present embodiment, the phase detection AF unit 129 converts the image shift amount into a detected defocus amount by utilizing a conversion coefficient calculated based on a baseline length, using the relationship in which the magnitude of the image shift amount between the first focus detection signal and the second focus detection signal increases as the magnitude of the defocus amount of the captured image signal increases.

Flow of AF Operations

Figure 7A:
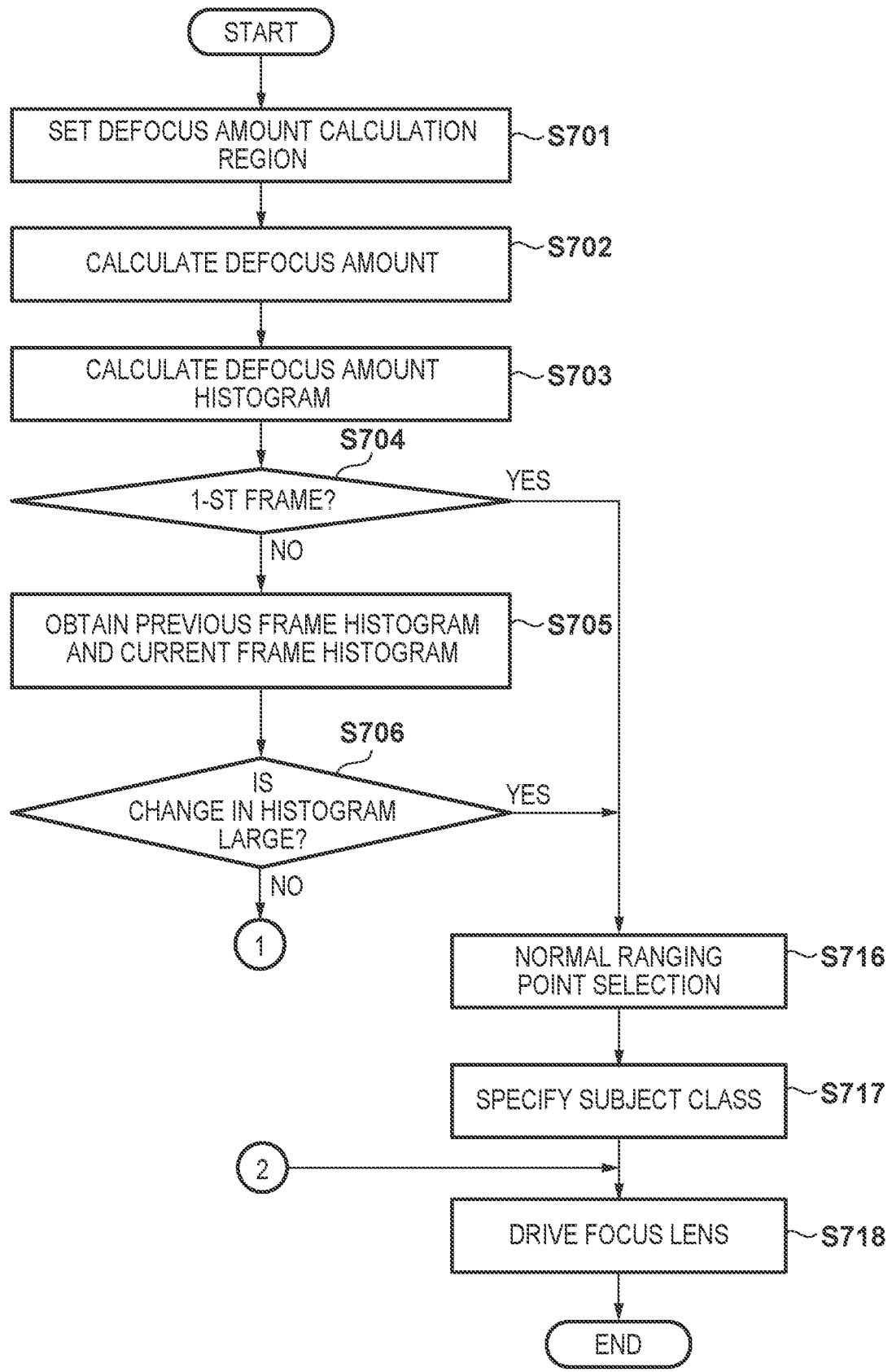
FIG. 7A is a flowchart illustrating AF operations.
Figure 7B:
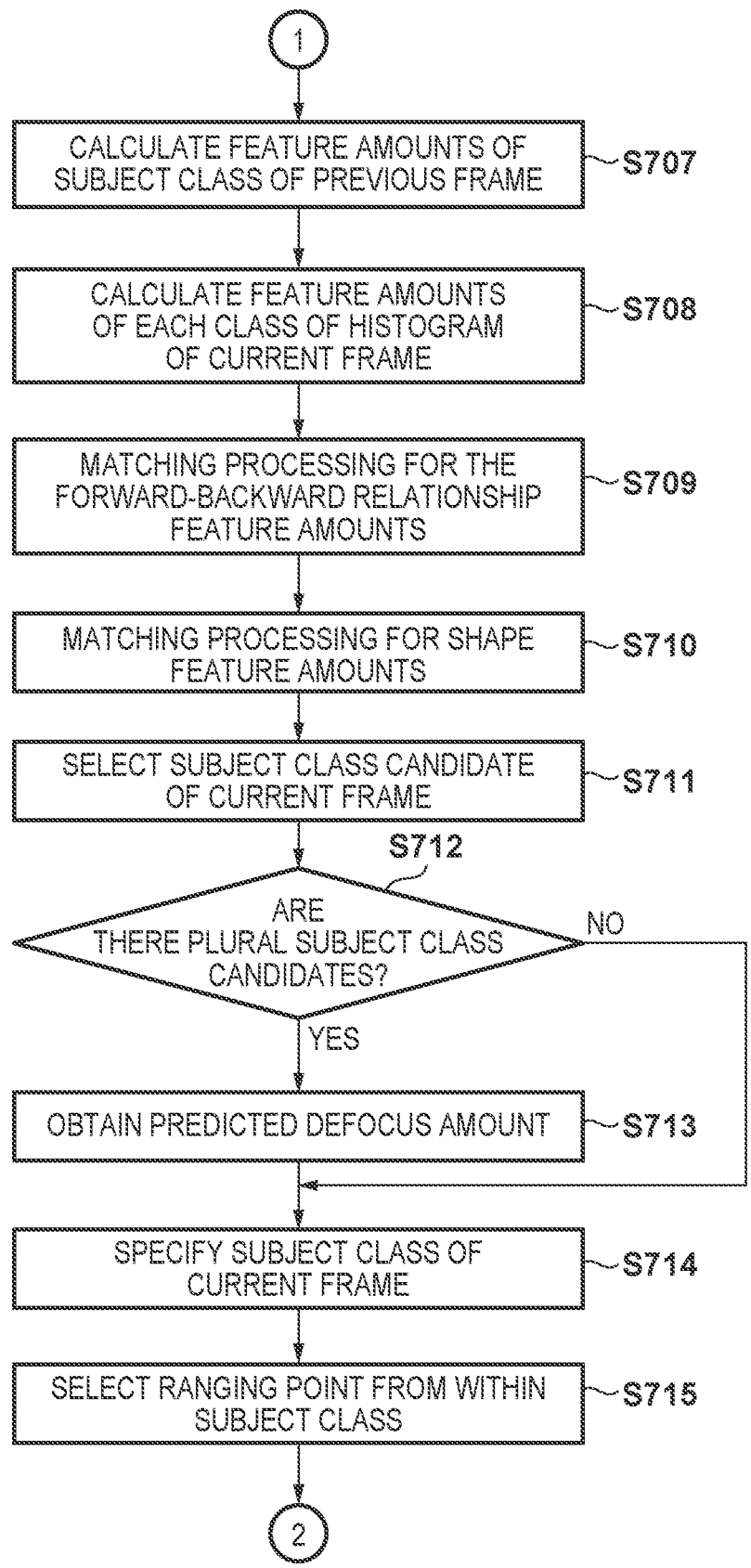
FIG. 7B is a flowchart illustrating AF operations.

FIGS. 7A and 7B are flowcharts illustrating AF operations. These AF operations are executed by the camera MPU 125 on a frame-by-frame basis. The camera MPU 125 operates with the lens MPU 117 as necessary to perform the AF operations.

FIGS. 8A and 8B are conceptual diagrams illustrating subjects, histograms, matching of feature amounts in a forward-backward relationship, and matching of shape feature amounts, for frames 1 to 4. It is assumed that from frame 1 to frame 4, a subject 801 (a subject to be tracked) is moving toward the near side (the front side), and a subject 802 is stationary. In frame 1, the image capturing apparatus 10 performs focusing operations for the subject 801 based on a displayed AF frame 800. From frame 2 on, the image capturing apparatus 10 performs focusing operations for the subject 801 while tracking the position of the subject 801 using a histogram. However, as will be described later, for frame 4, the histogram changes greatly between the current frame (frame 4) and the previous (frame), and subject tracking using the histogram is therefore not performed.

The processing performed for each frame, from frame 1 to frame 4, will be described according to the flowcharts in FIGS. 7A and 7B.

(1) Frame 1

In step S701, the camera MPU 125 sets the entire angle of view as a defocus amount calculation region. Note, however, that the defocus amount calculation region need not be the entire angle of view. For example, the camera MPU 125 may set part of the angle of view as the defocus amount calculation region, based on the size of the displayed AF frame 800, a detected subject region, or the like.

In step S702, the camera MPU 125 calculates the defocus amount for each of a plurality of ranging points in the defocus amount calculation region set in step S701.

In step S703, the camera MPU 125 calculates a histogram based on the defocus amount of each ranging point calculated in step S702. In the histograms in FIG. 8A, the horizontal axis represents the defocus amount. The left side of the horizontal axis represents infinity, and the right side of the horizontal axis represents the near end. The vertical axis represents the frequency of a defocus amount belonging to each of classes. Note that the bin interval (width of each class) and range of the histogram are set by the camera MPU 125 based on at least one of the subject distance (the distance of the subject in a depth direction), the size of the subject, and the aperture value at the time of shooting. The aperture value at the time of shooting can be used to calculate the subject depth size on the image plane by converting the value. Setting the bin interval according to the subject depth size based on the aperture value makes it possible to appropriately set the resolution when representing the subject as a histogram, regardless of the conditions. Note that the method for setting the bin interval and range of the histogram is not limited thereto, and for example, the camera MPU 125 may calculate the histogram using a bin interval and a range determined in advance.

In step S704, the camera MPU 125 determines whether the frame to be processed is the first frame. Frame 1 corresponds to the first frame, and thus the camera MPU 125 moves the processing to step S715.

In step S716, the camera MPU 125 performs normal ranging point selection. Here, "normal ranging point selection" is assumed to be selecting a ranging point at the center of the displayed AF frame 800, but is not limited thereto. For example, the camera MPU 125 may select a ranging point indicating a defocus amount at the nearest end in the displayed AF frame 800, a ranging point at the nearest end within a region near the center of the angle of view, a ranging point near the ranging point selected previously, or the like.

In step S717, the camera MPU 125 specifies a class of the histogram, to which the ranging point selected in step S716 belongs, as a subject class of frame 1. Assume here that a class 841 of the histogram of frame 1 is specified as the subject class of frame 1.

In step S718, the camera MPU 125 drives the focus lens 104 (controls the driving of the focus lens 104) based on the defocus amount at the ranging point selected in step S716.

The foregoing processing completes the AF operations for frame 1.

(2) Frame 2

Frame 2 will be described next. The processing of steps S701 to S703 is similar to that for frame 1, and will therefore not be described. In step S704, frame 2 is not the first frame, and thus the camera MPU 125 moves the processing to step S705.

In step S705, the camera MPU 125 obtains the histogram of frame 1, which is the previous frame, and the histogram of frame 2, which is the current frame. In each histogram, the mountain on the left side corresponds to the subject 801, and the mountain on the right side corresponds to the subject 802. In frame 2, the subject 801 is closer to the near side, and the size within the angle of view is also greater, than in frame 1, and as such, the mountain on the left side, corresponding to the subject 801, has moved toward the near side (the right side) and become larger. The class 841 of the histogram for frame 1 is the subject class specified in frame 1.

In step S706, the camera MPU 125 determines whether the change in the histogram (shape change) between the previous frame and the current frame is large. If the change in the histogram is large, the subject class can be specified through histogram matching processing (comparison processing), and thus in this step, the camera MPU 125 determines whether to perform the matching processing.

Figure 9A:
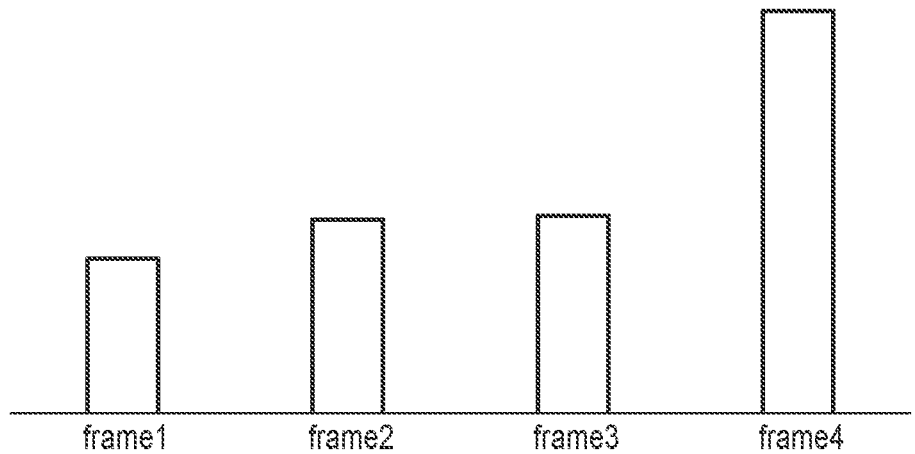
FIG. 9A is a diagram illustrating evaluation values for shapes pertaining to an overall histogram in each frame.
Figure 9B:
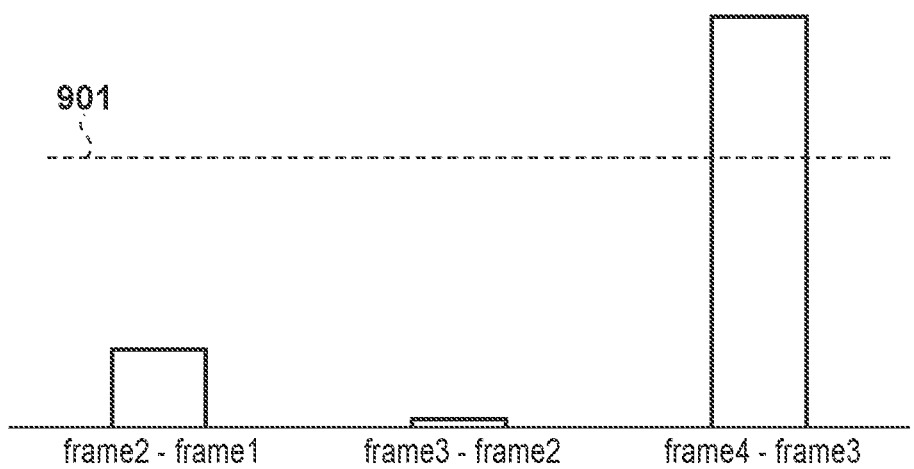
FIG. 9B is a diagram illustrating evaluation values for shape changes in each frame.

FIGS. 9A and 9B are diagrams illustrating evaluation values for shapes pertaining to an overall histogram in each frame, and evaluation values for shape changes in each frame. FIG. 9A illustrates evaluation values for shapes pertaining to the overall histogram in each frame, where the evaluation value for each shape is a sum of squares of the difference from the adjacent bin in the histogram of each frame. However, the evaluation value of the shape is not limited to the sum of squares of the difference from the adjacent bin, and may be an absolute sum of the difference from the adjacent bin, for example. FIG. 9B illustrates evaluation values for shape changes in each frame, where the evaluation value for a shape change is an absolute difference between the evaluation values of a shape between the current frame and the previous frame.

A threshold 901 (a second threshold) indicated in FIG. 9B is a threshold for determining whether the shape change is large. If the evaluation value for the shape change is greater than the threshold 901, the camera MPU 125 determines that the shape change is large and does not perform the matching processing. The evaluation value for the shape change in frame 2 corresponds to the leftmost value in FIG. 9B, which is smaller than the threshold 901. Accordingly, the camera MPU 125 determines that the shape change is not large, and moves the processing to step S707 to perform the matching processing.

In step S707, the camera MPU 125 calculates feature amounts of the subject class of frame 1, which is the previous frame. Here, two types of feature amounts (a forward-backward relationship feature amount and a shape feature amount) are calculated.

The forward-backward relationship feature amount (a feature amount of a second type) for the subject class in frame 1 (the class 841) is a sum of the frequencies of each class in a range of the histogram further on the near side than the class 841, and is a forward-backward relationship feature amount 821 in FIG. 8B. However, the configuration of the forward-backward relationship feature amount is not limited thereto, and for example, the forward-backward relationship feature amount may be the sum of the frequencies of each class in a range of the histogram further on the infinity side than the class 841. The sum of all histogram regions is equivalent to the number of ranging points, and thus the sum of the frequencies for either the near side or the infinity side can be used to ascertain a forward-backward relationship between the subject and other obstructions or the like.

The feature amount of the shape of the subject class (the class 841) of frame 1 (a feature amount of a first type) is the sum of the frequencies of each class in a range of the class 841±x1 of the histogram. ±x1 is a value related to the depth size of the subject, and a depth distribution of the subject can be found from the sum of the frequencies in the range of the class 841±x1. The camera MPU 125 determines the value of x1 based on at least one of the subject distance (the distance of the subject in the depth direction), the size of the subject, and the aperture value at the time of shooting, for example. The aperture value at the time of shooting can be used to calculate the subject depth size on the image plane by converting the value. The subject distance and the size of the subject are also related to the depth size of the subject. Note that the configuration of the feature amount of the shape is not limited thereto, and the feature amount of the shape may, for example, be the sum of absolute differences between the frequency of the subject class (the class 841) and each class in the range of the class 841±x1 or the like.

In step S708, the camera MPU 125 calculates feature amounts of each class of frame 2, which is the current frame. Here, similar to step S707, two types of feature amounts (a forward-backward relationship feature amount and a shape feature amount) are calculated. However, while the feature amounts are calculated only for the subject class in step S707, feature amounts are calculated for each class in step S708.

In step S709, the camera MPU 125 performs matching processing for the forward-backward relationship feature amounts in the previous frame (frame 1) and the current frame (frame 2), calculated in steps S707 and S708. In FIG. 8B, the forward-backward relationship feature amount 821 indicates a forward-backward relationship feature amount for the subject class in frame 1, and a forward-backward relationship feature amount 812 indicates the forward-backward relationship feature amount for each class in frame 2. In this step, the camera MPU 125 specifies the class (a class 832 in the example in FIG. 8B) in the forward-backward relationship feature amount 812 of frame 2 that matches (has the closest value to) the forward-backward relationship feature amount 821 of frame 1. In this step, a movement destination of a specific subject is specified using the fact that subjects present before and after the specific subject do not change greatly from frame to frame.

In step S710, the camera MPU 125 performs matching processing for the shape feature amounts in the previous frame (frame 1) and the current frame (frame 2), calculated in steps S707 and S708. In FIG. 8B, a correlation value 862 indicates an absolute difference between the shape feature amount of the subject class in frame 1 and the shape feature amounts of each class in frame 2, where a smaller indicates a higher degree of matching.

In step S711, the camera MPU 125 selects a subject class candidate for the current frame (frame 2). Specifically, based on the correlation value 862, the camera MPU 125 selects a subject class candidate from within a range of the class 832±x2, which is near the class 832 specified in step S709 (a first plurality of classes). Limiting the range for selecting the subject class candidate to the range of the class 832±x2 makes it possible to exclude similar shapes located at a distance. The value of x2 is determined in advance, for example, and is stored in the ROM 125a. A specific value can be used as x2. Next, taking into account a case where a plurality of similar shapes are present within the selection range, the camera MPU 125 calculates a correlation threshold 852 (a first threshold) as a value x3 times a minimum value of the correlation value 862. The value of x3 is determined in advance, for example, and is stored in the ROM 125a. Then, the camera MPU 125 selects, as the subject class candidate, a class showing a lower correlation value than the correlation threshold 852 in the selection range for the correlation value 862. In frame 2, only a class 842 shows a lower correlation value than the correlation threshold 852 in the selection range for the correlation value 862, and thus the camera MPU 125 selects the class 842 as the subject class candidate.

Note that if reducing the processing load is to be prioritized over improving the accuracy of specifying the subject class, the camera MPU 125 may skip the processing for limiting the selection range of the subject class candidate based on the forward-backward relationship feature amount matching processing. In this case, the camera MPU 125 selects the subject class candidate based on the correlation value 862 and the correlation threshold 852, from the entire range of the histogram (the first plurality of classes in a case where the selection range is not limited).

Additionally, the camera MPU 125 may skip the processing for selecting the subject class candidate based on the correlation threshold 852. In this case, the camera MPU 125 may detect a class corresponding to the minimum value of the correlation value 862 in the selection range (or the entire range) (i.e., a class having the shape feature amount closest to the shape feature amount of the subject class in the previous frame), and specify the detected class as the subject class of the current frame.

Additionally, the camera MPU 125 may swap the use of the forward-backward relationship feature amount and the use of the shape feature amount. In other words, the camera MPU 125 may limit the selection range based on shape feature amount matching, and select a subject class candidate based on forward-backward relationship feature amount matching in the selection range.

Additionally, the camera MPU 125 may select the subject class candidate based on forward-backward relationship feature amount matching, without using the shape feature amount. In this case, the class 832 (or a plurality of classes near the class 832) indicated in FIG. 8B is selected as the subject class candidate.

In step S712, the camera MPU 125 determines whether there are a plurality of subject class candidates. In frame 2, there is one subject class candidate, and thus the camera MPU 125 moves the processing to step S714.

In step S714, the camera MPU 125 specifies the subject class of the current frame. In frame 2, only the class 842 is a subject class candidate, and thus the camera MPU 125 specifies the class 842 as the subject class of the current frame.

In step S715, the camera MPU 125 selects one ranging point from among the ranging points belonging to the subject class specified in step S714.

In step S718, the camera MPU 125 drives the focus lens 104 based on the defocus amount at the ranging point selected in step S715.

The foregoing processing completes the AF operations for frame 2.

Although the foregoing describes a configuration in which a ranging point is selected in step S715 and the driving of the focus lens 104 is controlled based on the defocus amount at the selected ranging point in step S718, the present embodiment is not limited to this configuration. For example, a configuration may be employed in which the driving of the focus lens 104 is controlled based on a representative defocus amount, an average defocus amount, or a nearest end defocus amount of the subject class specified in step S714.

(3) Frame 3

Frame 3 will be described next. The processing of steps S701 to S710 is similar to that for frame 2, and will therefore not be described. However, for frame 3, the "previous frame" corresponds to frame 2 and the "current frame" corresponds to frame 3. Accordingly, for the forward-backward relationship feature amount, in step S707, a forward-backward relationship feature amount 822, indicated in FIG. 8B, is calculated as the forward-backward relationship feature amount for the subject class of the previous frame (frame 2). Additionally, in step S708, a forward-backward relationship feature amount 813, indicated in FIG. 8B, is calculated as the forward-backward relationship feature amount for each class in the current frame (frame 3). Furthermore, in step S709, a class 833, indicated in FIG. 8B, is specified through the matching processing. Similarly, for the shape feature amounts, processing is performed for the previous frame (frame 2) and the current frame (frame 3) in steps S707, S708, and S710.

In step S711, the camera MPU 125 selects a subject class candidate for the current frame (frame 3). Similar to the case of frame 2, based on a correlation value 863, the camera MPU 125 selects a subject class candidate from within a range of the class 833±x2, which is near the class 833 specified in step S709. Next, similar to the case of frame 2, the camera MPU 125 calculates a correlation threshold 853 (a first threshold) as a value x3 times a minimum value of the correlation value 863. Then, the camera MPU 125 selects, as the subject class candidate, a class showing a lower correlation value than the correlation threshold 852 in the selection range for the correlation value 863. In frame 3, a class 843a (a first class) and a class 843b (a second class) show lower correlation values than the correlation threshold 853 in the selection range for the correlation value 863, and thus the camera MPU 125 selects the class 843a and the class 843b as subject class candidates.

In step S712, the camera MPU 125 determines whether there are a plurality of subject class candidates. In frame 3, there are two subject class candidates, and thus the camera MPU 125 moves the processing to step S713.

In step S713, the camera MPU 125 obtains a predicted defocus amount by predicting the defocus amount of the current frame based on the defocus amount of the subject in the previous frame (or a plurality of past frames).

In step S714, the camera MPU 125 specifies the subject class candidate, among the subject class candidates selected in step S711 (the class 843a and the class 843b), which has the defocus amount closest to the predicted defocus amount obtained in step S713 (e.g., the class 843a) as the subject class of the current frame.

The processing of steps S715 and S718 is similar to that for frame 2, and will therefore not be described. The foregoing processing completes the AF operations for frame 3.

(4) Frame 4

Frame 4 will be described next. The processing of steps S701 to S705 is similar to that for frame 2, and will therefore not be described. However, for frame 4, the "previous frame" corresponds to frame 3 and the "current frame" corresponds to frame 4.

In step S706, the camera MPU 125 determines whether the shape change in the histogram between the previous frame and the current frame is large. If the shape change in the histogram is large, the subject class can be specified through histogram matching processing, and thus in this step, the camera MPU 125 determines whether to perform the matching processing.

As described earlier for frame 2, the threshold 901 indicated in FIG. 9B is a threshold for determining whether the shape change is large. If the evaluation value for the shape change is greater than the threshold 901, the camera MPU 125 determines that the shape change is large and does not perform the matching processing. The evaluation value for the shape change in frame 4 corresponds to the rightmost value in FIG. 9B, which is larger than the threshold 901. Accordingly, the camera MPU 125 determines that the shape change is large and moves the processing to step S716. In other words, for frame 4, the matching processing is not performed, and subject tracking using the histogram (specifying the subject class of the current frame based on histogram matching processing, indicated in step S714) is not performed.

In step S716, the camera MPU 125 performs normal ranging point selection. Here, "normal ranging point selection" is assumed to be selecting a ranging point near the ranging point selected the previous time.

In step S717, the camera MPU 125 specifies a class of the histogram, to which the ranging point selected in step S716 belongs, as a subject class of frame 4.

In step S718, the camera MPU 125 drives the focus lens 104 based on the defocus amount at the ranging point selected in step S716.

The foregoing processing completes the AF operations for frame 4.

As described thus far, according to the first embodiment, the image capturing apparatus 10 obtains a first histogram of a plurality of defocus amounts corresponding to a plurality of ranging points in a first shot image (e.g., frame 1 in FIG. 8A). Additionally, the image capturing apparatus 10 obtains a first subject class (e.g., the class 841 in FIG. 8A) which is a class, of the first histogram, to which a defocus amount of a subject to be tracked in the first shot image belongs. Additionally, the image capturing apparatus 10 obtains a second histogram of a plurality of defocus amounts corresponding to a plurality of ranging points in a second shot image (e.g., frame 2 in FIG. 8A) shot after the first shot image. Next, the image capturing apparatus 10 calculates a feature amount of the first type (e.g., the shape feature amount) of the first subject class in the first histogram. Additionally, the image capturing apparatus 10 calculates a plurality of the feature amounts of the first type (e.g., the shape feature amount) of the first plurality of classes of the second histogram (e.g., the classes in the entire range of the second histogram) in the second histogram. Then, the image capturing apparatus 10 detects a first class (e.g., the class 842 in FIG. 8B) that, among the first plurality of classes of the second histogram (e.g., the classes in the entire range of the second histogram), has the feature amount of the first type closest to the feature amount of the first type in the first subject class. Then, based on the first class, the image capturing apparatus 10 specifies a second subject class (e.g., the class 842 in FIG. 8B) which is a class, of the second histogram, to which a defocus amount of the subject to be tracked in the second shot image belongs. This makes it possible to track the subject between shot images (between frames) with a high level of accuracy.

Note that the stated first class does not absolutely have to be the class having the first type of feature amount closest to the feature amount of the first type in the first subject class. For example, the image capturing apparatus 10 may detect a specific first class, among the first plurality of classes of the second histogram (e.g., the classes in the entire range of the second histogram), based on the feature amount of the first type in the first subject class.

Additionally, the image capturing apparatus 10 may limit the detection range for the first class to a specific range of the second histogram, as indicated by the range of the class 832±x2 in FIG. 8B, for example. In this case, the image capturing apparatus 10 can make the limitation based on matching processing for the feature amount of the second type (e.g., the forward-backward relationship feature amount) in the first subject class and a plurality of the feature amounts of the second type (e.g., the forward-backward relationship feature amount) in a second plurality of classes (e.g., the classes in the entire range of the second histogram) of the second histogram. This makes it possible to further improve the accuracy of subject detection.

The present embodiment described using the defocus amount as distance information pertaining to the position of the subject in the depth direction (the distance). However, a variety of forms can be employed as the distance information. In other words, it is sufficient for the distance information to directly express a distance value of the subject in the depth direction within the image or indirectly express information corresponding to a distance value, and specifically, the distance information may be an image shift amount, a subject distance indicating the distance to the subject, or the like.

In other words, it is sufficient for an obtainment unit to obtain at least one of an image shift map, a defocus map, or a subject distance map corresponding to image shift amount, defocus amount, or subject distance distribution information, and calculate (obtain) a corresponding histogram.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-078081, filed Apr. 30, 2021 which is hereby incorporated by reference herein in its entirety.

What is claimed is:

1. A subject tracking apparatus comprising at least one processor and/or at least one circuit which functions as:
    an obtainment unit configured to obtain a first shot image, a second shot image shot after the first shot image, first distance information in a depth direction in a plurality of regions in the first shot image, and second distance information in a depth direction in a plurality of regions in the second shot image; and
    a specifying unit configured to specify a subject to be tracked in the first and second shot images based on the first distance information of the first shot image and the second distance information of the second shot image, wherein the specifying unit specifies a region of the subject to be tracked in the second shot image corresponding to a region of the subject to be tracked in the first shot image by comparing the first histogram of the first distance information of the first shot image and the second histogram of the second distance information of the second shot image.

2. The subject tracking apparatus according to claim 1, wherein the specifying unit specifies a class of the subject to be tracked in the second shot image based on a result of finding a correlation between a feature amount of a class of the histogram of the first shot image, to which the distance information of the subject to be tracked in the first shot image belongs, with a feature amount of each of classes of the histogram of the second shot image.

3. The subject tracking apparatus according to claim 2, wherein as the region of the subject to be tracked in the second shot image, the specifying unit specifies a region corresponding to a class specified as the class of the subject to be tracked in the second shot image.

4. A subject tracking apparatus comprising at least one processor and/or at least one circuit which functions as:
an obtainment unit configured to obtain a first histogram of a plurality of defocus amounts corresponding to a plurality of ranging points in a first shot image, a first subject class that is a class of the first histogram to which a defocus amount of a subject to be tracked in the first shot image belongs, and a second histogram of a plurality of defocus amounts corresponding to a plurality of ranging points in a second shot image shot after the first shot image;
a calculation unit configured to calculate a feature amount of a first type of the first subject class in the first histogram corresponding to the first shot image, and a plurality of feature amounts of the first type of a first plurality of classes of the second histogram in the second histogram corresponding to the second shot image;
a detection unit configured to detect, based on the feature amount of the first type in the first subject class in the first histogram corresponding to the first shot image, a specific first class among the first plurality of classes of the second histogram corresponding to the second shot image; and
a specifying unit configured to, based on the specific first class, specify a second subject class that is a class of the second histogram to which a defocus amount of the subject to be tracked in the second shot image belongs.

5. The subject tracking apparatus according to claim 4, wherein as the first class, the detection unit detects, a class, among the first plurality of classes of the second histogram, that has a feature amount of the first type closest to the feature amount of the first type of the first subject class.

6. The subject tracking apparatus according to claim 5, wherein the specifying unit specifies the first class as the second subject class.

7. The subject tracking apparatus according to claim 5, wherein for a second class, among the first plurality of classes of the second histogram, that has a feature amount of the first type closest to the feature amount of the first type of the first class, when a difference between the feature amount of the first type of the second class and the feature amount of the first type of the first class is greater than a first threshold, the specifying unit specifies the first class as the second subject class, and
when the difference between the feature amount of the first type of the second class and the feature amount of the first type of the first class is less than the first threshold, the specifying unit specifies the first class or the second class as the second subject class based on a predetermined criterion.

8. The subject tracking apparatus according to claim 7, wherein the at least one processor and/or at least one circuit further functions as a prediction unit configured to predict the defocus amount of the subject to be tracked in the second shot image based on the defocus amount of the subject to be tracked in the first shot image,
wherein the predetermined criterion is configured such that a class, among the first class and the second class, that corresponds to a defocus amount close to the defocus amount predicted is specified as the second subject class.

9. The subject tracking apparatus according to claim 4, wherein a respective feature amount of the first type represents a shape feature in a first range, including a class corresponding to the respective feature amount, of a histogram including the class corresponding to the respective feature amount.

10. The subject tracking apparatus according to claim 4, wherein a respective feature amount of the first type is a sum of frequencies of respective classes in a first range, including a class corresponding to the respective feature amount, of a histogram including the class corresponding to the respective feature amount.

11. The subject tracking apparatus according to claim 9, wherein a size of the first range corresponding to the feature amount of the first type of the first subject class is based on at least one of a distance, in a depth direction, of the subject to be tracked in the first shot image, a size of the subject to be tracked in the first shot image, and an aperture value used when the first shot image is shot.

12. The subject tracking apparatus according to claim 4, wherein a bin interval of the first histogram is based on at least one of a distance, in a depth direction, of the subject to be tracked in the first shot image, a size of the subject to be tracked in the first shot image, and an aperture value used when the first shot image is shot.

13. The subject tracking apparatus according to claim 4, wherein the calculation unit calculates a feature amount of a second type of the first subject class in the first histogram, and a plurality of feature amounts of the second type of a second plurality of classes of the second histogram in the second histogram, and
wherein the at least one processor and/or at least one circuit further functions as a selection unit configured to select, as the first plurality of classes of the second histogram, a plurality of classes, among the second plurality of classes of the second histogram, that are within a second range including a class having a feature amount of the second type closest to the feature amount of the second type of the first subject class.

14. The subject tracking apparatus according to claim 13, wherein a respective feature amount of the second type is a sum of frequencies of respective classes in a range, in a histogram including a class corresponding to the respective feature amount, further on a near side or a range further on an infinity than the class corresponding to the respective feature amount.

15. The subject tracking apparatus according to claim 4, wherein the at least one processor and/or at least one circuit further functions as a determination unit configured to determine whether a shape change between the first histogram and the second histogram is smaller than a second threshold,
wherein the specifying unit specifies the second subject class when the shape change is smaller than the second threshold.

16. The subject tracking apparatus according to claim 4, wherein the at least one processor and/or at least one circuit further functions as a control unit configured to control driving of a focus lens based on a defocus amount, among the plurality of defocus amounts corresponding to the plurality of ranging points in the second shot image, that belongs to the second subject class.

17. An image capturing apparatus, comprising:
the subject tracking apparatus according to claim 1; and
an image sensor configured to generate respective shot images.

18. An image capturing apparatus, comprising:
the subject tracking apparatus according to claim 4; and
an image sensor configured to generate respective shot images.

19. A subject tracking method executed by a subject tracking apparatus, comprising:
obtaining a first shot image, a second shot image shot after the first shot image, first distance information in a depth direction in a plurality of regions in the first shot image, and second distance information in a depth direction in a plurality of regions in the second shot image; and
specifying a subject to be tracked in the first and second shot images based on the first distance information of the first shot image and the second distance information of the second shot image,
wherein specifying the subject to be tracked in the first and second shot images includes specifying a region of the subject to be tracked in the second shot image corresponding to a region of the subject to be tracked in the first shot image by comparing a first histogram of the first distance information of the first shot image and a second histogram of the second distance information of the second shot image.

20. A subject tracking method executed by a subject tracking apparatus, comprising:
obtaining a first histogram of a plurality of defocus amounts corresponding to a plurality of ranging points in a first shot image, a first subject class that is a class of the first histogram to which a defocus amount of a subject to be tracked in the first shot image belongs, and a second histogram of a plurality of defocus amounts corresponding to a plurality of ranging points in a second shot image shot after the first shot image;
calculating a feature amount of a first type of the first subject class in the first histogram corresponding to the first shot image, and a plurality of feature amounts of the first type of a first plurality of classes of the second histogram in the second histogram corresponding to the second shot image;
detecting, based on the feature amount of the first type in the first subject class in the first histogram corresponding to the first shot image, a specific first class among the first plurality of classes of the second histogram corresponding to the second shot image; and
based on the specific first class, specifying a second subject class that is a class of the second histogram to which a defocus amount of the subject to be tracked in the second shot image belongs.

21. A non-transitory computer-readable storage medium which stores a program for causing a computer to execute a subject tracking method comprising:
obtaining a first shot image, a second shot image shot after the first shot image, first distance information in a depth direction in a plurality of regions in the first shot image, and second distance information in a depth direction in a plurality of regions in the second shot image; and
specifying a subject to be tracked in the first and second shot images based on the first distance information of the first shot image and the second distance information of the second shot image,
wherein specifying the subject to be tracked in the first and second shot images includes specifying a region of the subject to be tracked in the second shot image corresponding to a region of the subject to be tracked in the first shot image by comparing a first histogram of the first distance information of the first shot image and a second histogram of the second distance information of the second shot image.

22. A non-transitory computer-readable storage medium which stores a program for causing a computer to execute a subject tracking method comprising:
obtaining a first histogram of a plurality of defocus amounts corresponding to a plurality of ranging points in a first shot image, a first subject class that is a class of the first histogram to which a defocus amount of a subject to be tracked in the first shot image belongs, and a second histogram of a plurality of defocus amounts corresponding to a plurality of ranging points in a second shot image shot after the first shot image;
calculating a feature amount of a first type of the first subject class in the first histogram corresponding to the first shot image, and a plurality of feature amounts of the first type of a first plurality of classes of the second histogram in the second histogram corresponding to the second shot image;
detecting, based on the feature amount of the first type in the first subject class in the first histogram corresponding to the first shot image, a specific first class among the first plurality of classes of the second histogram corresponding to the second shot image; and
based on the specific first class, specifying a second subject class that is a class of the second histogram to which a defocus amount of the subject to be tracked in the second shot image belongs.

\* \* \* \* \*